United States Patent
Bathla

Patent Number: 5,987,903
Date of Patent: Nov. 23, 1999

[54] METHOD AND DEVICE TO DETECT THE CHARGE LEVEL IN AIR CONDITIONING SYSTEMS

[75] Inventor: Pritam S. Bathla, Shelby Township, Mich.

[73] Assignee: DaimlerChrysler Corporation, Auburn Hills, Mich.

[21] Appl. No.: 09/186,798

[22] Filed: Nov. 5, 1998

[51] Int. Cl.[6] .................................................. F25B 49/00
[52] U.S. Cl. ............................. 62/129; 62/126; 62/127; 62/228.3
[58] Field of Search ............................ 62/126, 127, 129, 62/228.3

[56] References Cited

U.S. PATENT DOCUMENTS

| | | |
|---|---|---|
| 4,463,576 | 8/1984 | Burnett et al. . |
| 4,677,830 | 7/1987 | Sumikawa et al. . |
| 4,827,730 | 5/1989 | Doi et al. . |
| 4,967,567 | 11/1990 | Proctor et al. . |
| 5,009,076 | 4/1991 | Winslow .............................. 652/129 |
| 5,150,584 | 9/1992 | Tomasov et al. . |
| 5,152,152 | 10/1992 | Brickner et al. . |
| 5,197,298 | 3/1993 | Kobayashi et al. ..................... 62/115 |
| 5,214,918 | 6/1993 | Oguni et al. . |
| 5,239,865 | 8/1993 | Salzer et al. . |
| 5,251,453 | 10/1993 | Stanke et al. . |
| 5,301,514 | 4/1994 | Bessler . |
| 5,341,649 | 8/1994 | Nevitt et al. . |
| 5,457,965 | 10/1995 | Blair et al. ............................. 62/129 |
| 5,481,884 | 1/1996 | Scoccia . |
| 5,586,445 | 12/1996 | Bessler . |
| 5,647,222 | 7/1997 | Sarakinis . |
| 5,649,429 | 7/1997 | Schreiber . |
| 5,713,213 | 2/1998 | Nobuta et al. . |

*Primary Examiner*—Henry Bennett
*Assistant Examiner*—Marc Norman
*Attorney, Agent, or Firm*—Roland A. Fuller III

[57] ABSTRACT

A method for detecting a refrigerant charge in an air conditioning system. A charge detection device is connected to the air conditioning system that is operated to produce cooling air. The input temperature and pressure are measured from sensors in the air conditioning system. The charge detection device determines an actual sub cooling value of the air conditioning system from the input temperature and pressure. A desired sub cooling value is then assigned based on the ambient temperature and humidity of the air in which the air conditioning system is operating. The desired sub cooling value is obtained from a database in the charge detection device. The database stores predetermined sub cooling values at an optimum charge for a fixed compressor rpm, a fixed evaporator airflow and various ambient conditions encountered during normal operation. The charge detection device selects the desired sub cooling value according to the specific ambient temperature and humidity during operation of the air conditioning system. The actual sub cooling value is than compared to the desired sub cooling value. The difference between the actual sub cooling value and the desired sub cooling value is compared to the acceptable predetermined sub cooling value range. If the difference is outside of the range, the user is informed that the air conditioning system requires service.

10 Claims, 4 Drawing Sheets

METHOD AND DEVICE TO DETECT THE CHARGE LEVEL IN AIR CONDITIONING SYSTEMS

BACKGROUND OF THE INVENTION

1. Field of the Invention

The present invention relates generally to a method and device for detecting the charge level in an air conditioning system, and more particularly, to a method and device for detecting the charge level in an automobile air conditioning system.

2. Discussion

Automotive air conditioning systems include a compressor, a condenser, an expansion device, and an evaporator connected by conduits to form a closed system. A mixture of refrigerant and oil, referred to as refrigerant charge, is circulated through the air conditioning system to produce cool air. The compressor receives the necessary lubrication from the oil in the refrigerant charge to circulate the refrigerant charge to the condenser, expansion device, and the evaporator. If the compressor is forced to function when the refrigerant charge is low, it can be damaged. The low refrigerant charge will cause increased compressor operating temperatures which would cause a reduced cycle system and an increase of compressor on time. Further, the low refrigerant charge can lower the mass flow rate decreasing the availability of the lubrication oil for the compressor and also causes the compressor to run hot. Therefore, the compressor will not receive enough lubrication oil to operate the system properly and will become damaged if it continues to operate.

There are a number of systems known to detect the charge in air conditioning systems. The refrigerant charge in a system has been measured by monitoring the pressure and temperature outside the compressor. If the system produces a high temperature and a low pressure outside the compressor, a low charge signal is indicated. Further, the refrigerant charge in a system has been measured by measuring the temperature and pressure after each process of the system. The measured values are compared to predetermined values to calculate the refrigerant charge. However, these methods can be inaccurate when determining the refrigerant charge level because the refrigerant charge is also effected by the compressor speed, air flow through the evaporator and the condenser. Consequently, if the inadequate charge level is not corrected immediately, the compressor will become damaged and can break down.

Therefore, it is desirable to improve the accuracy of detecting the refrigerant charge in an air conditioning system. Further, it is desirable to increase the durability of the compressor in the air conditioning system.

SUMMARY OF THE INVENTION

The present invention overcomes the short comings of the prior art. The present invention provides an accurate method for detecting a refrigerant charge in an air conditioning system. The air conditioning system includes a compressor, a condenser, an expansion valve, and an evaporator connected by conduits to form a closed system. A charge detection device is connected to the air conditioning system to detect the refrigerant charge of the air conditioning system while it is operating. The input temperature and pressure of the system are measured by sensors placed at the condenser outline in the air conditioning system. The charge detection device determines an actual sub cooling value of the air conditioning system based on the input temperature and pressure. The device also determines the desired sub cooling value based on the ambient temperature and pressure in which the air conditioning system is operating. The desired sub cooling value is obtained from a database in the charge detection device. The database stores predetermined sub cooling values at an optimum charge for a fixed compressor rpm, a fixed evaporator airflow and various ambient conditions encountered during normal operation. The charge detection device selects the desired sub cooling value according to the specific ambient temperature and humidity during operation of the air conditioning system. The actual sub cooling value is then compared to the desired sub cooling value. The difference between the actual sub cooling value and the desired sub cooling value is compared to an acceptable predetermined sub cooling value range. If the difference is outside of the range, the user is informed that the air conditioning system requires service.

BRIEF DESCRIPTION OF THE DRAWINGS

Additional advantages and features of the present invention will become apparent to those skilled in the art upon reading the following detailed description and upon reference to the drawings which.

DETAILED DESCRIPTION OF THE PREFERRED EMBODIMENT

The following description of the preferred embodiment is merely exemplary in nature and is in no way intended to limit the invention or its application or its uses.

Figure 1:
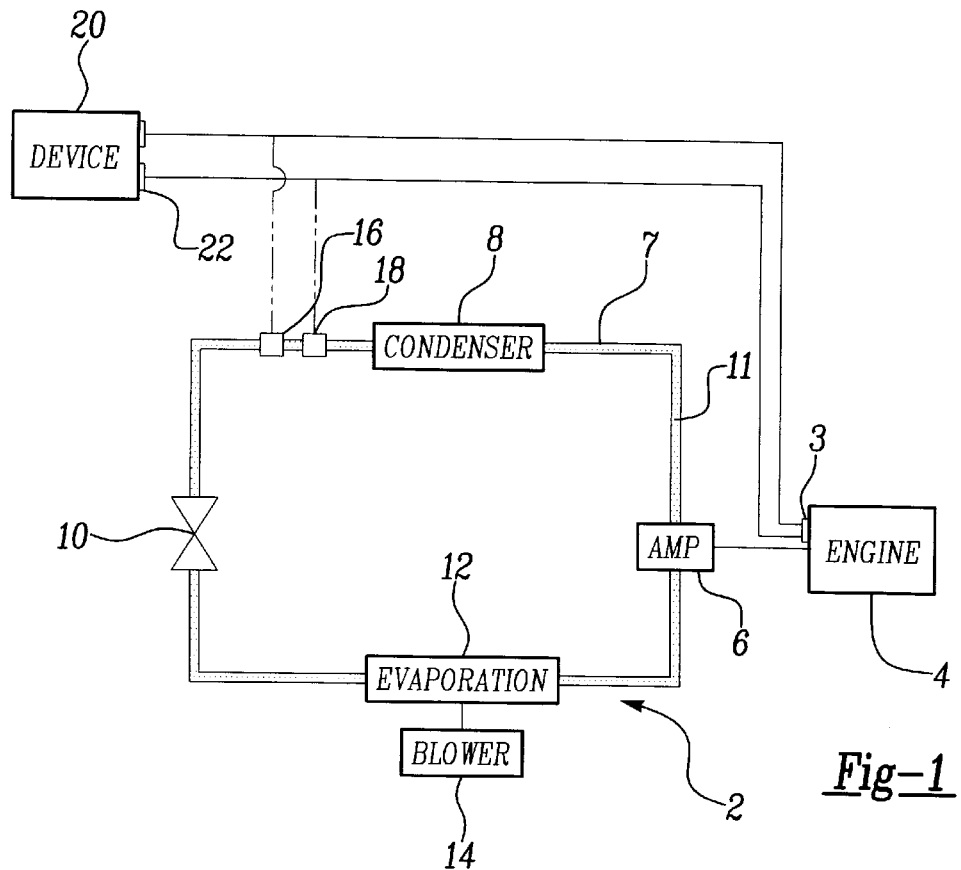
FIG. 1 is a block diagram showing the elements of the air conditioning system connected to the charge detection device.

Referring to FIG. 1, a closed air conditioning system 2 is illustrated connected to a charge detection device 20. The air conditioning system 2 includes a compressor 6, an condenser 8, an expansion valve 10 and an evaporator 12. The compressor 6, the condenser 8, the expansion valve 10, and the evaporator 12 are coupled together by conduits 7 to form a closed system. Also, a refrigerant 11 is present in the system, such as R134, which includes a lubricant. The compressor 6 is driven by an engine 4 and removes the refrigerant vapor from the evaporator 12 compressing it to high temperature and pressure. The condenser 8 takes the refrigerant from the compressor 6 and condenses it by removing heat until the fluid becomes a saturated refrigerant liquid. The refrigerant liquid passes through the expansion value 10. The pressure of the refrigerant liquid drops from high pressure to low pressure and the temperature drops from condensing temperature to evaporating temperature as the refrigerant liquid undergoes expansion through the expansion value 10. The mixture of liquid and vapor refrigerant is vaporized through absorption of heat in the evaporator 12. The blower 14 blows cool air out of the system 2 while the refrigerant vapor exiting the evaporator 12 is returned to the compressor 6 to repeat the cycle.

The present invention verifies the correctness of the refrigerant charge in an air conditioning system by measuring the sub cooling value in the system. The air conditioning system has a unique sub cooling value at each particular set of operating conditions and ambient environments and the amount of charge in the system. The sub cooling in the air conditioning system is also a function of the following parameters: compressor rpm, ambient temperature, ambient humidity, refrigerant charge, evaporation air flow, and air flow through the condenser. Variations in any of the above parameters will change the sub cooling value of the air conditioning system.

The air conditioning system 2 includes temperature and pressure sensors 16, 18 positioned at the condenser output line of the system. The temperature and pressure sensors 16, 18 are connected to the charge detection device 20. The sensors 16, 18 measure the temperature and pressure of the refrigerant charge as it leaves the condenser 8. The charge detection device 20 determines a real time sub cooling value of the system based on the temperature and pressure inputs provided by the sensors 16, 18 of the air conditioning system 2 for the specific operating conditions. Alternatively, the output sensors 16 and 18 may also be fed into the diagnostic center of the vehicle. Here, the leads from the device 20 are connected with the diagnostic plug 3 as seen in FIG. 1.

Figure 2:
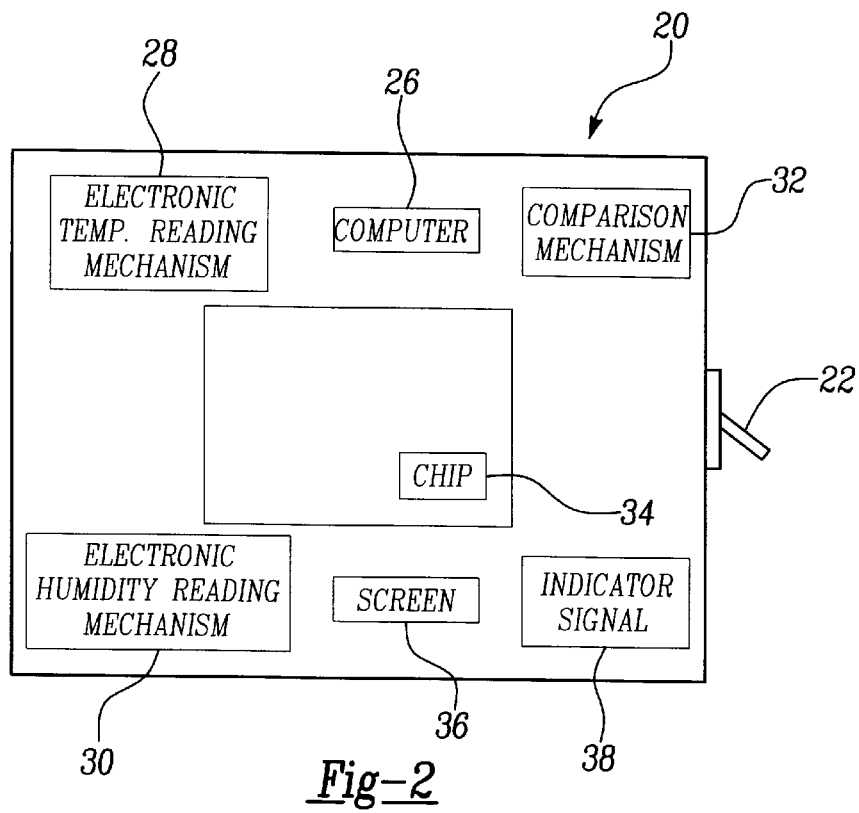
FIG. 2 is a diagram illustrating the elements of the charge detection device.
Figure 3:
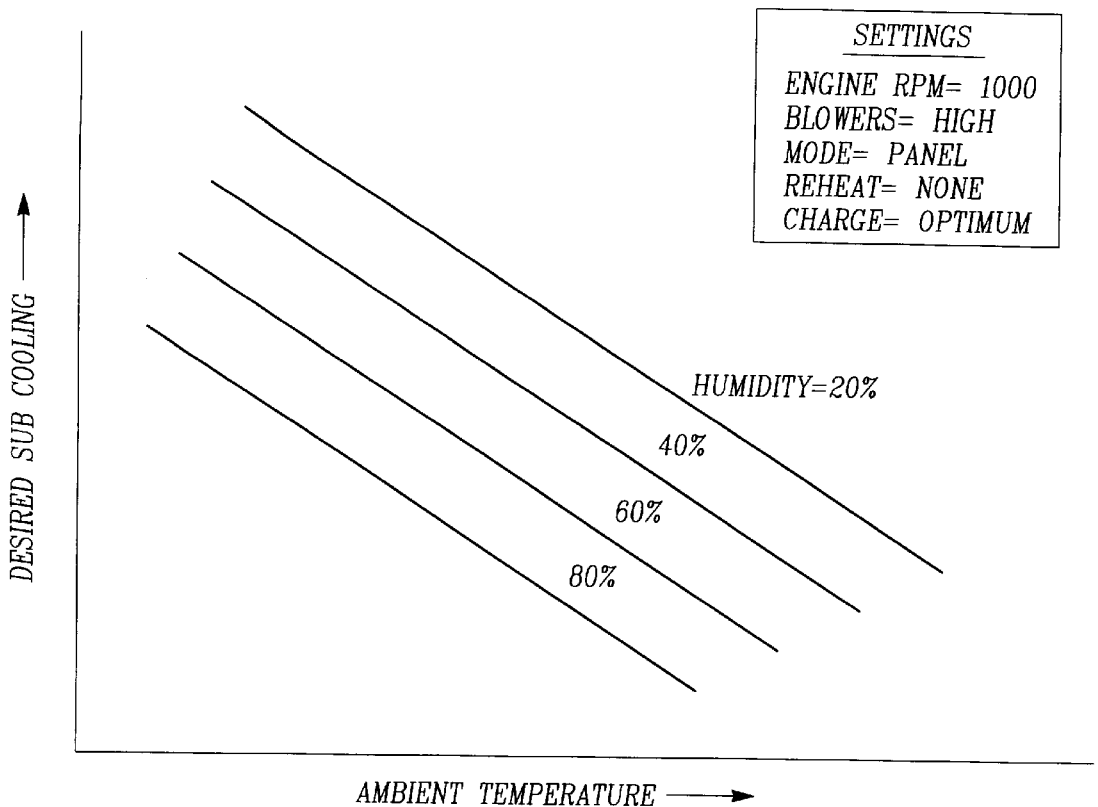
FIG. 3 is a conceptual graph of the desired sub cooling value as a function of ambient temperature and humidity.

FIG. 2 illustrates the charge detection device 20 of the present invention. The charge detection device 20 includes a connection mechanism 22 to connect the charge detection device 20 to the temperature and pressure sensors 16, 18 of the air conditioning system 2 or the diagnostic center in the vehicle. The device 20 has a computer for calculating the actual sub cooling value of the system based on the temperature and pressure measured by the sensors 16, 18 in the air conditioning system 2. The charge detection device 20 also has a database 24 for storing predetermined sub cooling values. The predetermined sub cooling values are established by testing the system at an optimum charge for a fixed compressor rpm, fixed evaporator air flow and various ambient conditions encountered by the system during its normal operating conditions. These predetermined sub cooling values are labeled as the desired sub cooling value. The device 20 includes an electronic temperature reading mechanism 28 and an electronic humidity reading mechanism 30. The electronic temperature reading mechanism 28 and the electronic humidity reading mechanism 30 monitor the ambient temperature and humidity of the environment in which the air conditioning system 2 is operating. The charge detection device 20 is able to determine the desired sub cooling value based on the database of sub cooling values stored in the device for the specific ambient temperature and humidity at the time the system 2 is operating. FIG. 3 illustrates a graph of the conceptual data stored in the database. The graph illustrates the desired sub cooling values as a function of the ambient temperature and the ambient humidity at a fixed set of operating conditions.

The charge detection device 20 includes a comparison mechanism 32 for comparing the actual sub cooling value and with the system running at fixed rpm, high blower panel mode and no reheat calculated based on the temperature and pressure measured by the sensors 16, 18 and the desired sub cooling values determined from the database for the ambient temperature and ambient humidity during operation of the system.

The charge detection device 20 displays the actual sub cooling value of the air conditioning system 2 and the desired sub cooling value of the air conditioning system 2 as they are being compared to determine the refrigerant charge.

These values are displayed on a screen 36 in the charge detection device 20. The screen 36 of the charge detection device 20 has additional features in which it can display other system variables such as ambient temperature, humidity, liquid temperature, and liquid pressure as requested by the user.

Figure 5:
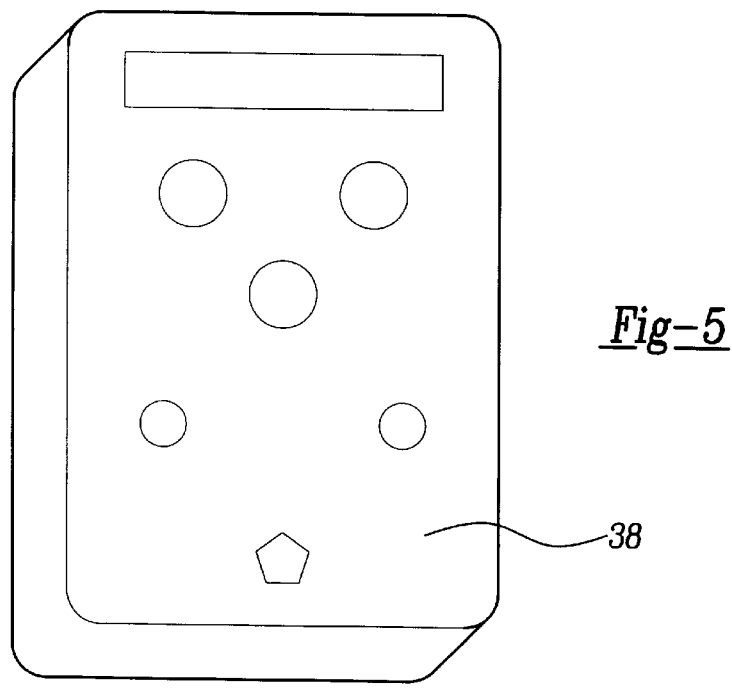
FIG. 5 is a diagram of the indicator signal of the charge detection device.
Figure 4:
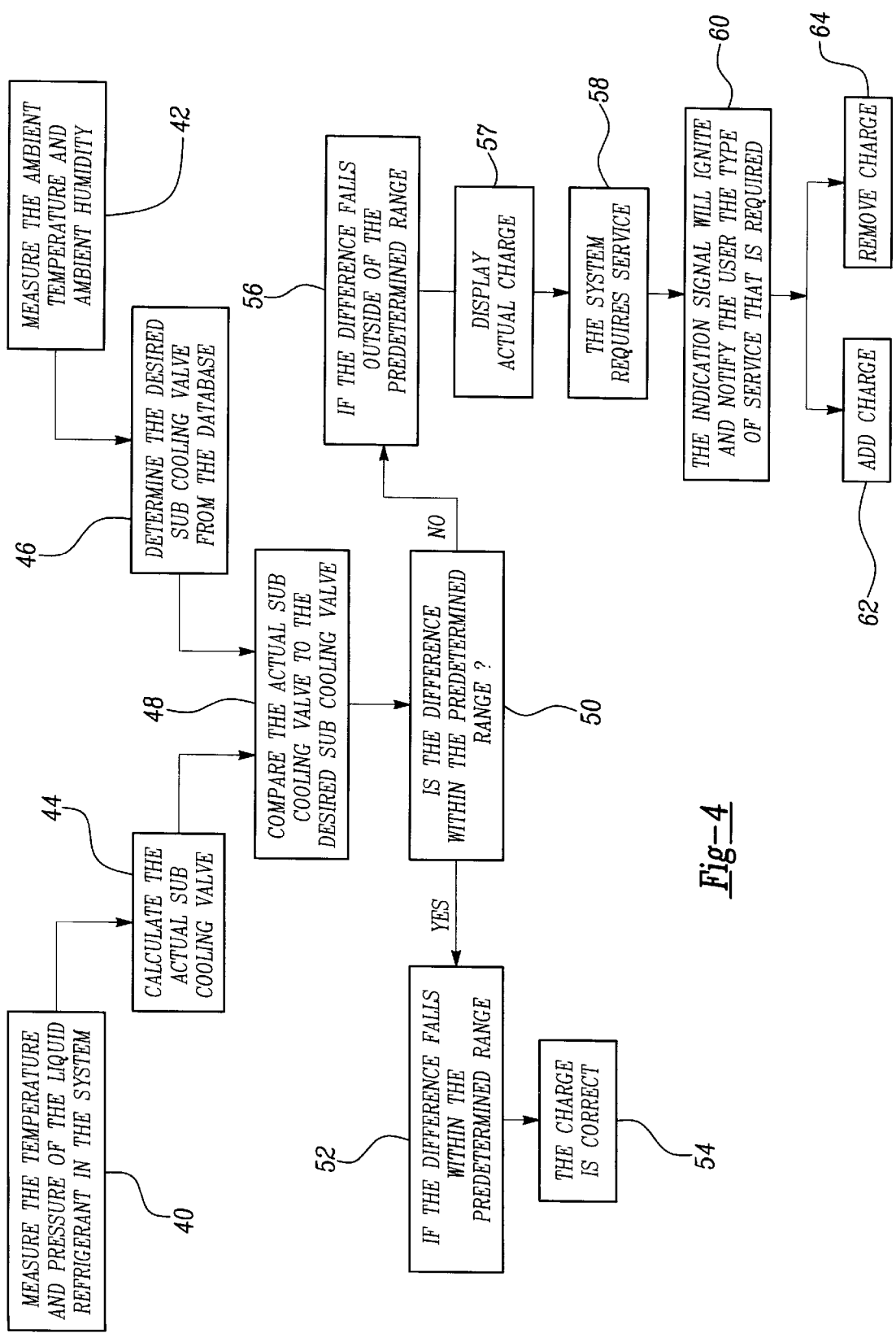
FIG. 4 is a flow chart of the charge detection process.

FIG. 4 illustrates the charge detection process of the present invention. The charge detection device measures the temperature and pressure of the refrigerant in the liquid line of the air conditioning system 40 and calculates the actual sub cooling value of the system 44. Concurrently, the charge detection device 20 measures the ambient temperature and ambient humidity 42 and determines the desired sub cooling value 46 from the database. Next, the charge detection device 20 compares the difference between the actual sub cooling value and the desired sub cooling value 48 to an acceptable predetermined range of refrigerant charge 50. If the difference falls within the range 52 than the refrigerant charge in the vehicle is correct 54. If the difference falls outside of the predetermined range 56, the charge detection device 20 will ignite an indicator signal accordingly. The indicator signal enables the charge detection device 20 to display the actual charge 57, as well as the type of service the air conditioning system 2 requires according to the level of refrigerant charge detected. As shown in FIG. 5, the indicator signal 38 will notify the user is the charge is correct, if the user needs to add charge, or if the user needs to remove charge.

Accordingly, the present invention provides a measurement of the refrigerant charge in the air conditioning system. If there is a change in the charge of the system, e.g. the charge leaks out, the charge detection device will determine if the refrigerant charge level requires service. Consequently, the user is notified of an inadequate charge level before any of the components of the air conditioning system are damaged.

The charge detection device 20 of the present invention is also capable of indicating the actual amount of the refrigerant charge in the system. The charge detection device 20 includes a chip 34 in the database 24 for storing sub cooling data as a function of ambient temperature and ambient humidity at various charge levels.

Figure 6:
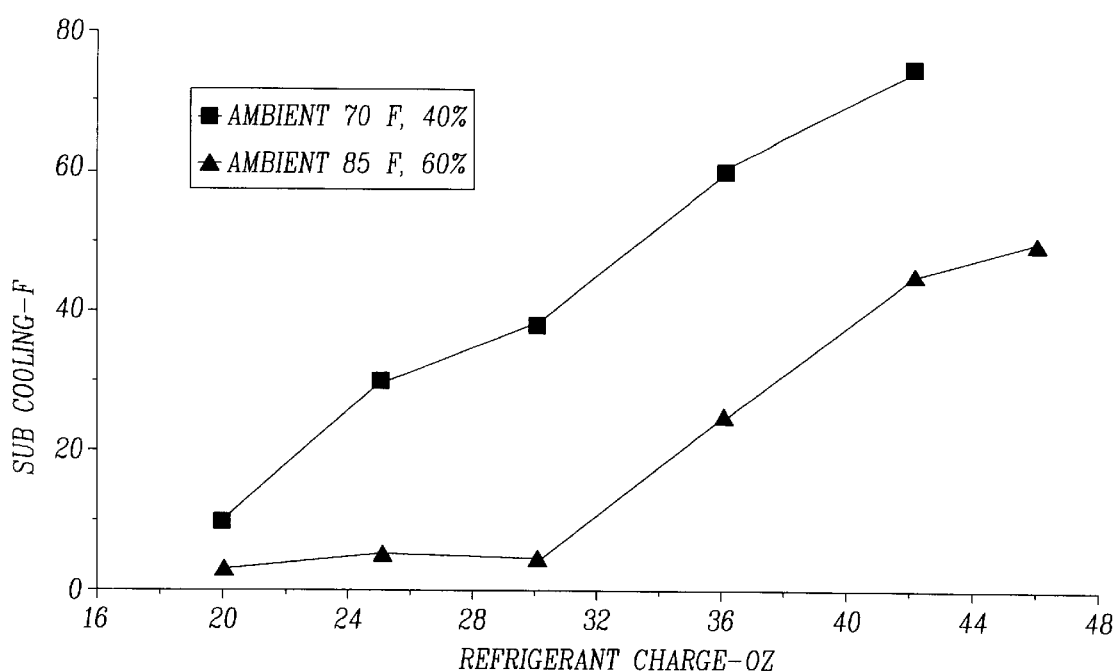
FIG. 6 is a sample graph of the sub cooling value as a function of refrigerant charge.

FIG. 6 illustrates a graph of the sub cooling values as a function of ambient temperature and ambient humidity at various charge levels. The computer 26 in the device 20 can extrapolate the temperature and humidity for the charge value range that falls between the data graphed in FIG. 5.

Similar to the determination of the refrigerant charge level, the charge detection device 20 calculates the actual charge of the system 2 by determining the desirable sub cooling value for an optimally charge system. The charge detection device 20 also calculates the actual sub cooling value based on the temperature and pressure measured by the temperature and pressure sensors 16, 18 in the air conditioning system 2. The device 20 compares the desired sub cooling value determined from the stored database to the actual sub cooling value. If the difference between the desired sub cooling value the actual sub cooling value falls within the predetermined acceptable range the refrigerant charge is optimum.

If the refrigerant charge is not optimum, the device will calculate the amount of charge available in the system. The device 20 will scan the chip 34 in the database 24 and will select the amount of the charge in the system 2 based on the actual sub cooling value that was calculated for the system. The charge detection device 20 will than display the actual charge value of the system on the screen 36.

The device 20 can be further expanded to include the sub cooling values for more than one vehicle. For example, the charge detection device 20 could detect the charge for the NS single, NS dual, LH, JA and PL by storing the test data for each of these vehicles in the chip. The charge detection device could also include the sub cooling data for trucks that use thermal expansion control devices.

The charge detection device 20 can also be used within air conditioning systems that use an orifice as the expansion device. A set of sub cooling values will be generated for the orifice valve system. The data would be programmed in the computer of the charge detection device. The remainder of the device works the same way as described in the preferred embodiment of the present invention to determine the charge level of the system.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A method for detecting a refrigerant charge in an air conditioning system comprising: providing an air conditioning system comprising a compressor, an engine for driving the compressor, a condenser, an expansion valve, an evaporator, a blower including a motor and a fan for blowing air out of the air conditioning system, conduits for coupling together the compressor, the condenser, the expansion valve and the evaporator to define a closed air conditioning system, and a fluid flowing through the conduits, wherein said closed air conditioning system produces a refrigerant charge for the air conditioning system at the system operating temperature and pressure, said method comprising:

connecting a charge detection device to the air conditioning system;

operating the air conditioning system to produce cooling air;

measuring an input temperature and pressure from sensors positioned between the condenser and the expansion valve in the air conditioning system;

determining an actual sub cooling value from said measured input temperature and pressure;

assigning a desirable sub cooling value obtained from predetermined sub cooling values stored in a data base in the charge detection device, said desired sub cooling values being selected based on ambient temperature and humidity during said operation of said air conditioning system;

comparing the actual sub cooling value with the desirable sub cooling value; and determining the difference between the actual sub cooling value and the desirable sub cooling value during operation of the air conditioning system and if the difference between the values is outside of an acceptable predetermined range, informing a user that the air conditioning system requires service.

2. The method according to claim 1, and further comprising programming the predetermined values in the data base at an optimum charge of the air conditioning system with a fixed compressor rpm, a fixed evaporator air flow and ambient conditions encountered during normal operation.

3. The method according to claim 1, and further comprising reading the ambient temperature and humidity by electronic temperature and humidity reading mechanisms in the charge detection device.

4. The method according to claim 1, and further comprising displaying the actual sub cooling value and the desirable sub cooling value on a screen in the charge detection device.

5. The method according to claim 1, and further comprising igniting an indicator light to indicate the service required.

6. The method according to claim 1, and further comprising calculating an actual refrigerant charge value in the air conditioning system, wherein calculating the actual refrigerant charge value includes programming the database of the charge detection device with sub cooling values at various charge levels;

scanning the database for the amount of charge available in the air conditioning system based on the actual sub cooling value of the air conditioning system; and displaying the available charge on a screen in the charge detection device.

7. A charge detection device for detecting a charge of an air conditioning system comprising a compressor, a engine for driving the compressor, a condenser, an expansion valve, an evaporator, a blower including a motor and a fan for blowing air out of the air conditioning system, conduits for coupling together the compressor, the condenser, the expansion valve and the evaporator to define a closed air conditioning system, and a fluid flowing through the conduits, wherein said closed air conditioning system produces a refrigerant charge for the air conditioning system at the system operating temperature and pressure, said charge detection device comprising:

a database for storing predetermined desired sub cooling values at various ambient conditions;

a temperature sensor and a pressure sensor positioned between the condenser and the expansion valve;

a computer for determining an actual sub cooling value based on readings from the temperature and pressure sensors during operation of the air conditioning system;

a connection mechanism coupled with said database and said computer adapted to be connected to the air conditioning system;

an electronic humidity reading mechanism for monitoring ambient humidity;

an electronic temperature reading mechanism for monitoring ambient temperature;

a comparison mechanism for comparing the actual sub cooling value to the desired sub cooling value; and a display device for informing a user if the air conditioning system requires service.

8. The charge detection device according to claim 7, wherein said display device comprises a screen for displaying the actual sub cooling value and the desired sub cooling value.

9. The charge detection device according to claim 7, wherein said display device comprises an indicator light for indicating the type of service required.

10. A device according to claim 7, wherein said database includes a chip for storing sub cooling data as a function of ambient temperature and humidity at various charge levels.

* * * * *